US011566391B2

(12) United States Patent
Iozzo, Jr.

(10) Patent No.: US 11,566,391 B2
(45) Date of Patent: Jan. 31, 2023

(54) DEVICE FOR HOLDING A BOAT FENDER

(71) Applicant: Fender Holster LLC, New York, NY (US)

(72) Inventor: Nicola Iozzo, Jr., New York, NY (US)

(73) Assignee: FENDER HOLSTER LLC, New York, NY (US)

( * ) Notice: Subject to any disclaimer, the term of this patent is extended or adjusted under 35 U.S.C. 154(b) by 0 days.

(21) Appl. No.: 17/480,268

(22) Filed: Sep. 21, 2021

(65) Prior Publication Data

US 2022/0145561 A1 May 12, 2022

Related U.S. Application Data

(60) Provisional application No. 63/112,755, filed on Nov. 12, 2020, provisional application No. 63/149,873, filed on Feb. 16, 2021.

(51) Int. Cl.
*E02B 3/26* (2006.01)
*B63B 59/02* (2006.01)

(52) U.S. Cl.
CPC ............. *E02B 3/26* (2013.01); *B63B 59/02* (2013.01)

(58) Field of Classification Search
CPC ...... B63B 59/02; B63B 2059/025; E02B 3/26
USPC ...... 114/219, 220; 405/211, 211.1, 212, 213, 405/214, 215, 216
See application file for complete search history.

(56) References Cited

U.S. PATENT DOCUMENTS

| 4,653,419 | A | * | 3/1987 | Brandon | E02B 3/26 |
| | | | | | 114/361 |
| 5,016,554 | A | * | 5/1991 | Harris, Jr. | E02B 3/26 |
| | | | | | 114/220 |
| 7,721,667 | B2 | * | 5/2010 | Kaemmerling | B63B 59/02 |
| | | | | | 114/219 |
| 9,193,418 | B1 | * | 11/2015 | Brelsford | B63B 21/00 |
| 2019/0112773 | A1 | * | 4/2019 | Dean | E02B 3/26 |

FOREIGN PATENT DOCUMENTS

| GB | 478154 | A | * | 1/1938 |
| JP | 5-25812 | A | * | 2/1993 |
| JP | 5-39085 | A | * | 2/1993 |

* cited by examiner

*Primary Examiner* — Sunil Singh
(74) *Attorney, Agent, or Firm* — Leason Ellis LLP

(57) ABSTRACT

A device for holding a boat fender in place at an installation site, such as a dock. The device including a main fabric body that is foldable and has a first end, an opposing second end, a first side, and an opposing second side. The device further includes first and second adjustable fasteners configured to attach the second end to the first end for allowing the main fabric body to cradle and hold the boat fender. A boat fender strap has a first end that is attached to the main fabric body and an opposing second end that is detachably attached to the main fabric body. The boat fender strap is configured to pass through a center hole of the boat fender for securely attaching the boat fender to the main fabric body.

11 Claims, 7 Drawing Sheets

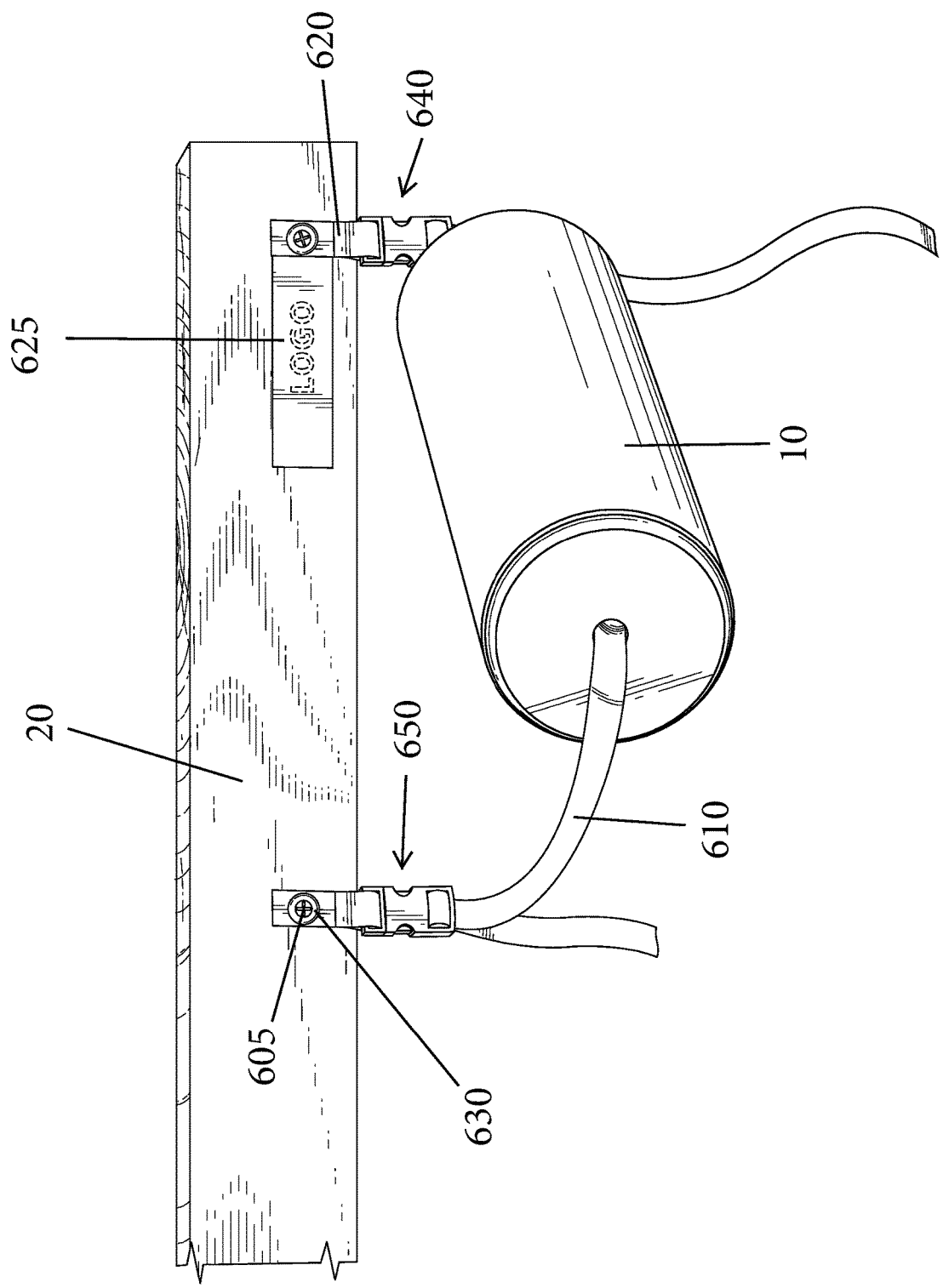

DEVICE FOR HOLDING A BOAT FENDER

CROSS REFERENCE TO RELATED APPLICATIONS

The present application claims priority to and the benefit of U.S. patent application Ser. No. 63/112,755, filed Nov. 12, 2020 and U.S. patent application Ser. No. 63/149,873, filed Feb. 16, 2021, both of which are hereby expressly incorporated by reference in their entireties.

TECHNICAL FIELD

The present disclosure relates to boat accessories and more particularly, to a device for holding a boat fender along an edge of a dock or other structure without the need for ropes to hold the boat fender in place.

BACKGROUND

Boat fenders are essential equipment for any boat to protect the hull from contact, with docks, pilings and other objects, such as other boats. Whether inflated or soft foam, cylindrical, spherical or flat, boat fenders absorb the shock of vessels bumping into docks or other vessels. They insulate the boat from damage and decelerate it as it surges and rolls about. Boats that tie up to docks usually set fenders just above the waterline to maintain a buffer zone between dock and boat.

There are many different types of boat fenders and they come in different shapes and sizes. For example, one common type of boat fender is a cylindrical center hole boat fender. This type of boat fender has a cylindrical body and has a through hole that extends from one end to the other end. The sizing of the boat fender is primarily selected in view of the boat weight, the boat length and mooring conditions. One common general rule of thumb is that a cylindrical fender should have 1" of diameter for every 4' to 5' of boat length.

As shown in FIG. 1, when installing a boat fender 10 to a dock 5 or similar structure, cleats 20 are installed on the dock 5 and then rope 30 is used to tie the boat fender 10 to the cleat 20. Installing cleats and other hardware is time consuming and the ropes need constant adjusting to get the boat fender 10 to an acceptable height and always require readjusting as passage of time and weather conditions causes the ropes 30 to slip resulting in the boat fender 10 being a less than optimal position. Cleats 20 also tend to snag hoses that are used to wash down the boat and this presents another nuisance and challenge.

Alternative products that are commercially available also suffer from a number of deficiencies. For example, sheets of rubber can be purchased for installation along the edge of the dock; however, the rubber sheet does not provide enough thickness to protect and prevent scratches to the boat's hull.

There is therefore a need for an alternative way to secure a boat fender to a dock or similar structure.

SUMMARY

A device for holding a boat fender in place at an installation site, such as a dock. The device including a main fabric body that is foldable and has a first end, an opposing second end, a first side, and an opposing second side. The device further includes first and second adjustable fasteners configured to attach the second end to the first end for allowing the main fabric body to cradle and hold the boat fender. A boat fender strap has a first end that can be detachably attached to the main fabric body and an opposing second end that is detachably attached to the main fabric body. The boat fender strap is configured to pass through a center hole of the boat fender for securely attaching the boat fender to the main fabric body.

BRIEF DESCRIPTION OF THE DRAWING FIGURES

FIG. 7 is a top perspective view of the holster of FIG. 6 secured to an edge of the dock.

DETAILED DESCRIPTION OF CERTAIN EMBODIMENTS

Figure 2:
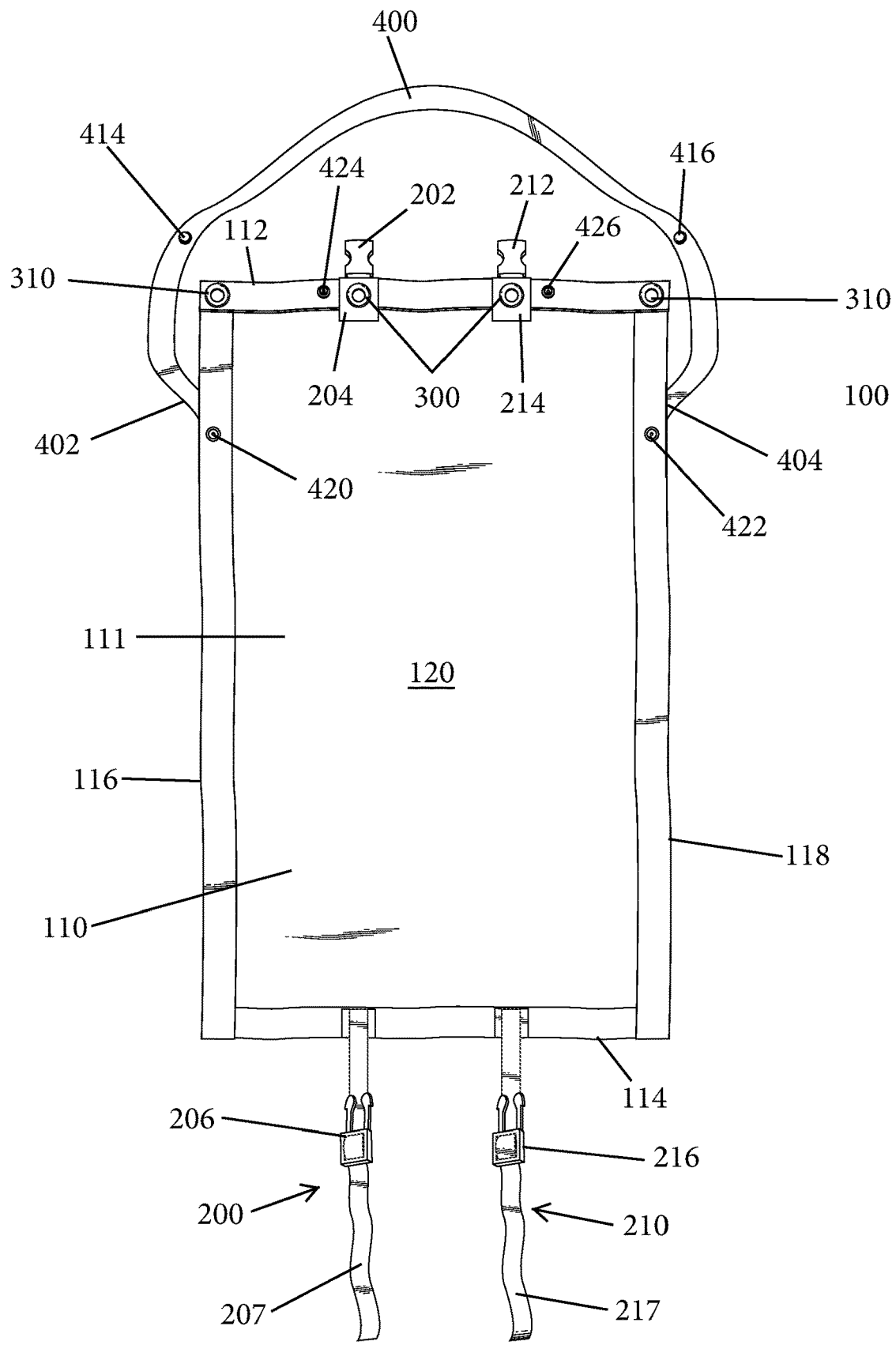
FIG. 2 is a front elevation view of a holster device) for a boat, fender, wherein the holder is in an unrolled state.
Figure 3:
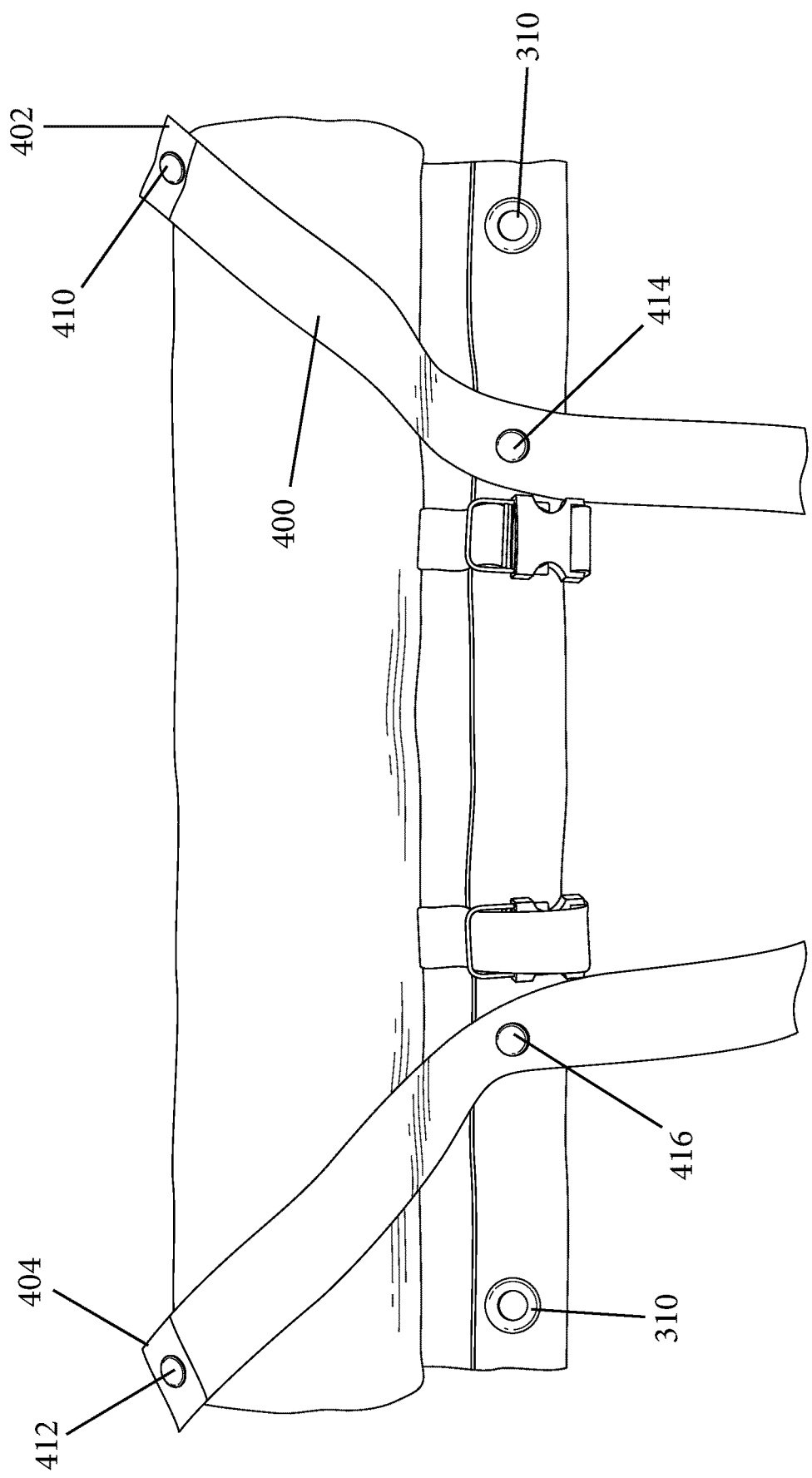
FIG. 3 is a top plan view of the holder in a rolled state.
Figure 4:
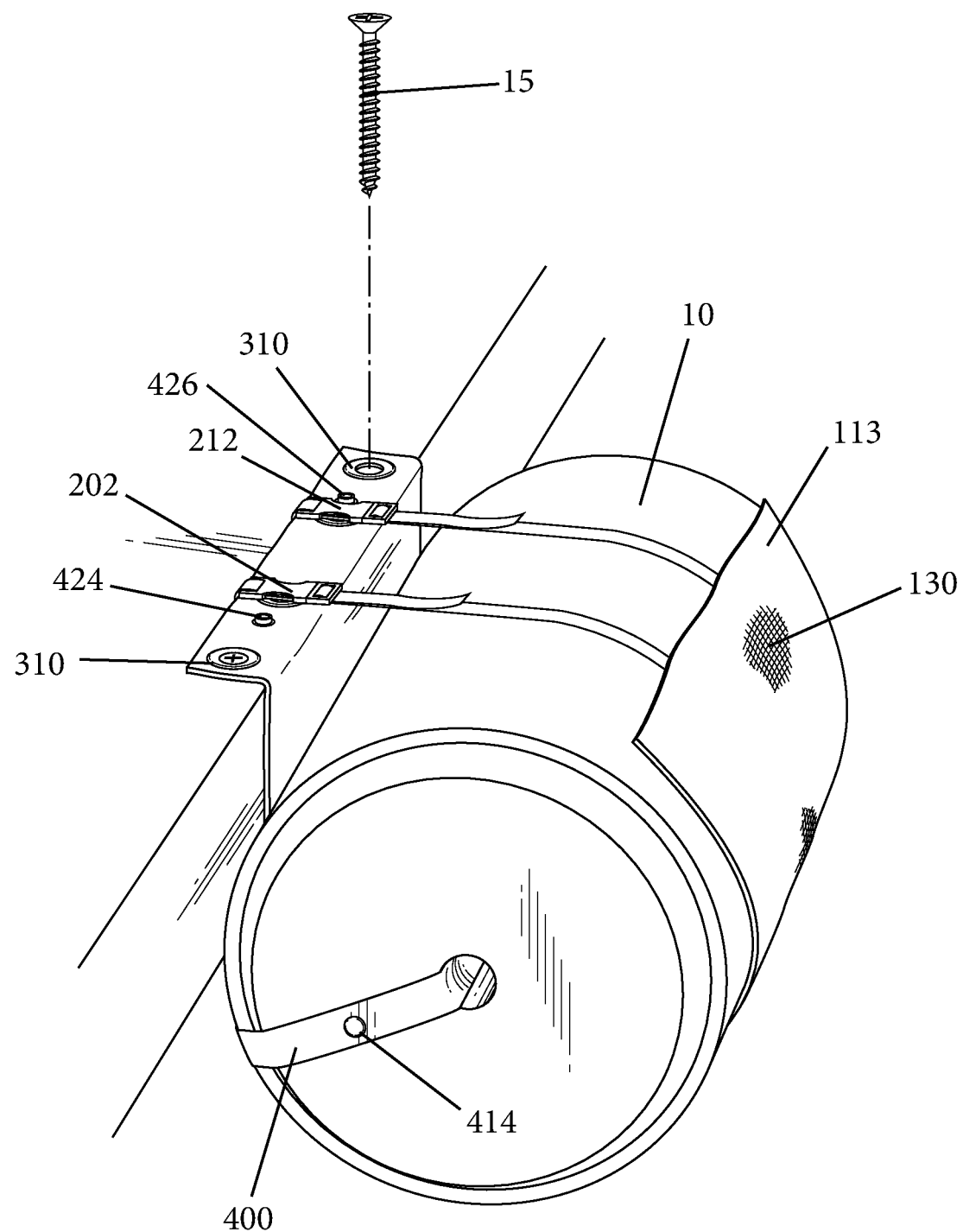
FIG. 4 is a perspective view of a fender coupled to the holster itself is anchored to a dock.

FIGS. 2-4 illustrate a device 100 for securely holding the boat fender 10 along a structure 20, such as a dock or the like. The device 100 can be thought of as being a holster or holder for the boat fender 10.

The device 100 includes a main body 110 that is in the form of a piece of flexible (fabric) material cut to a desired size. The main body 110 has a first end 112, an opposing second end 114, a first side 116 and an opposing second side 118. The main body 110 can have a rectangular shape with the ends 112, 114 parallel to one another and the sides 116, 118 being parallel to one another. The main body 110 has a first face 111 and an opposing second face 113.

In the illustrated embodiment, the main body 110 is formed of a piece of marine fabric and therefore, is desired to withstand the conditions at an outside dock. The main body 110 provides a suitable soft material that does not scratch or otherwise mar the boat's hull when being in contact therewith. In the illustrated embodiment, the main body 110 can be formed of a single fabric material (single sheet) or it can be formed of two or more fabric materials (two or more sheets).

For example, the main body 110 can be formed of a base material 120, such as a marine fabric, and can include a second layer 130 that covers a select area of the base material 120 along the second face 113. The second layer 130 can be attached to the base material 120 using conventional techniques such as sewing. The second layer 130 is positioned in areas that contact the hull of the boat during normal use. The first face 111 only comes into contact with the fender 10 and therefore, the first face 111 does not include any second layer 130. Not all of the second face 113 comes into contact with the hull of the boat and therefore, only about 40-60 percent of the second face 113 can include the second layer 130. For example, the second layer 130 can extend from an intermediate location of the second face 113 and extend to the second end 114 of the second face 113. The second layer 130 is designed to provide a plusher contact surface for the hull. The base material 120 can comprise a rugged marine fabric.

The second layer 130 is formed of soft fabric that does not scratch the hull of the boat. In one embodiment, the second layer 130 is a spectropile solution-dyed non-woven plush polyester. The size of the second layer 130 is selected in view of its intended purpose of being a surface against which the boat's hull contacts. In other words, in the in-use position oaf the device 100, the second layer 130 is positioned for contacting the boat's hull.

The device 100 also includes a pair of fasteners that are configured to detachably attach the first end 112 of the main body 110 to the second end 114 of the main body 110, thereby capturing, holding and retaining the boat fender 10. The pair of fasteners includes a first fastener 200 and a second fastener 210 that are configured to maintain the main body 110 in an attached state. The first fastener 200 includes a first buckle part 202 that is attached to the first end 112 with a first strap segment 204 and a second buckle part 206 that is adjustably attached along a first strap 207 that is attached to the second end 114 of the main body 110. The second fastener 210 includes a first buckle part 212 that is attached to the first end 112 with a second strap segment 214 and a second buckle part 216 that is adjustably attached along a second strap 217 that is attached to the second end 114 of the main body 110.

In the illustrated embodiment, the first buckle parts 202, 212 are female parts, while the second buckle parts 206, 216 are male parts. The female parts have a hollow center space for receiving the male parts and have a pair of side locking slots for receiving locking prongs of the male parts. To release the male part, the two flexible locking prongs are squeezed inwardly to clear the side locking slots and then the male and female parts are separated.

The second buckle parts 206, 216 can slide along the straps 207, 217 to adjust the location of the second buckle parts 206, 216.

While in one embodiment, the first and second fasteners can be plastic quick side release snap buckles, it will be appreciated that the first and second fasteners can take other forms such as snaps, buttons, etc.

As shown, the first and second strap segment 204, 214 can be attached to the first end 112 using a first set of grommets 300 and/or can be stitched to the main body 110. For example, the strap segments 204, 214 can be attached via the grommets 300 and have its edges stitched to the main body 110. Each of the first set of grommets 300 includes a through hole the use of which is described below. The strap 207, 217 can be attached to the second end 114 using traditional techniques, such as stitching.

The device 100 also includes a boat fender strap 400 that is configured to secure the boat fender 10 to the device 100. The boat fender strap 400 has a first end 402 and an opposing second end 404. The first end 402 is attached to or along the first side 116 of the main body 110 and the second end 404 is detachably attached to or along the second side 118 of the main body 110.

The first end 402 can be fixedly attached to or along the first side 116 or can detachably attached thereto as shown (e.g., by using a snap).

In the illustrated embodiment, the first end 402 includes a first fastener 410, the second end 404 includes a second fastener 412 and preferably, the boat fender strap 400 includes a third fastener 414 and a fourth fastener 416 that are both located between the first and second fasteners 410, 412. For example, the third fastener 414 can be located closer to the first fastener 410 and the fourth fastener 416 can be located closer to the second fastener 412. The first fastener 410 mates with a fifth fastener 420 that is located at or along the first side 116 of the main body 110 and the second fastener 412 mates with a sixth fastener 422 that is located at or along the second side 118 of the main body 110. The third fastener 414 is configured to mate with a seventh fastener 424 that is located along the first end 112 and the fourth fastener 416 is configured to mate with an eighth fastener 426 that is located along the first end 112. As shown in the figures, the ends of the strap 400 can be detachably attached at its ends to the rear face 113.

In one embodiment, the fasteners 410-426 comprise snaps and more specifically, the first, second, third and fourth fasteners 410-416 comprise one of male snap parts and female snap parts and the fifth, sixth, seventh, and eighth fasteners 420-426 comprise the other of male snap parts and female snap parts.

As mentioned, the first end 402 can be fixedly attached to the main body and in such event, the first and fifth fasteners 410, 420 are eliminated and the first end 402 can stitched or otherwise attached to the main body 110.

The boat fender strap 400 is formed of a fabric material suitable for the intended outdoor environment.

A second set of grommets 310 can be provided along the first end 112 of the main body 110. The second set of grommets 310 can be located in the corners of the first end 112. Like the first grommets, the second set of grommets 310 have through holes.

As shown, the seventh fastener 424 and the eighth fastener 426 are located between the first and second sets of grommets 300, 310.

In-Use Position

FIG. 4 shows the device 100 in an in-use position in which the device 100 acts as a holster and cradles one boat fender 10.

The device 100 is anchored to the dock by using fasteners 15 that pass through the first and second grommets 300, 310 into the dock. The fasteners can be in the form of screws or the like and include fender washers. The first end 112 of the main body 110 is thus located along a top edge of the dock and the device 100 drapes over the side of the dock with the second end 114 being below the top edge of the dock.

The main body 110 is much like blanket that is draped around and surrounds the boat fender 10. The device 100 securely holds the boat fender 10 using two means, namely, by using the boat fender strap 400 and by attaching the ends 112, 114 to one another using the pair of first fasteners. The boat fender strap 400 is fed through the center hole in the boat fender 10 and the ends 402, 404 of the strap 400 are attached to the sides 116, 118 of the main body 110. It will be appreciated that the strap 400 is fed through the center hole by detaching one end 402, 404 and then feeding the detached end through the center hole whereupon when it exits, it is attached to the main body 110.

The main body 110 is also at least partially wrapped around the boat fender 10 in that the boat fender 10 is placed along the first face 111 and then the second end 114 is drawn towards the first end 112 and the second buckle parts 206, 216 (male parts) are inserted into the first buckle parts 202, 212 (female parts). The lengths of the first strap 207 and the second strap 217 are then adjusted by pulling the straps until the main body 110 is held tightly around the boat fender 10. The result is the boat fender 10 is cradled within the device 100. By upwardly curving the main body 110, the second face 113 is exposed and it is this surface that faces away from the fender that is for contacting the hull.

Advantageously, the device 100 can be secured to the dock; sits in a fixed position, but can be adjusted if necessary, is made of a material that prevents scratches and abrasions should the boat come in contact with it. The device 100 also looks nice in place, not haphazardly installed and sloppy. At the end of the season, the user has no ropes to contend with and instead the user takes out the boat fender 10 and rolls up the device 100 until the next season. The device 100 can be physically removed from the dock at the end of the season or it can be left at the dock in its stored position, which is described below.

In the event that the boat fender is of a type that has two openings one at each end of the boat fender, the boat fender strap 400 can be first fed through the opening at one end of boat fender and runs along the boat fender before passing through the second opening at the other end of the boat fender before then attaching to the main fabric body 110.

Storage Position

FIG. 3 shows the device 100 in a storage position in which the main body 110 is rolled up with the first end 112 being exposed. To hold the device in a roiled position, the boat fender strap 400 is used to secure and hold the device 100 in the storage position. The strap 400 is attached to the first end 112 at two location and more specifically, the third fastener 414 mates with the seventh fastener 424 and the fourth fastener 416 mates with the eighth fastener 426 resulting in the device 100 being maintained in a rolled, stored position. When the boat fender strap 400 is attached to the main body 110 at these two locations, the boat fender strap 400 defines a looped handle that allows the device 100 to be carried.

Figure 1:
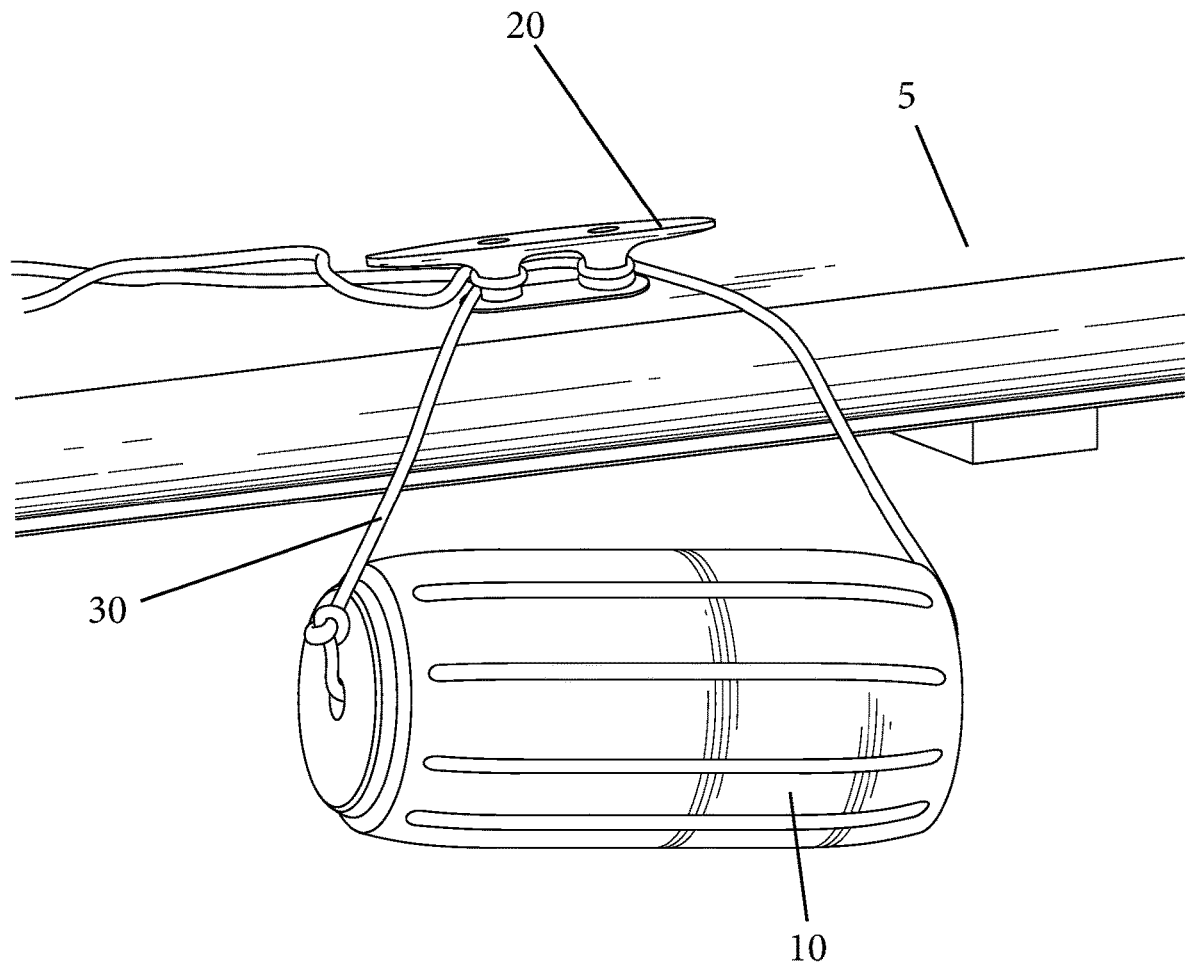
FIG. 1 is a perspective view of a traditional boat fender attached with a rope to a cleat that is anchored to a dock.
Figure 5:
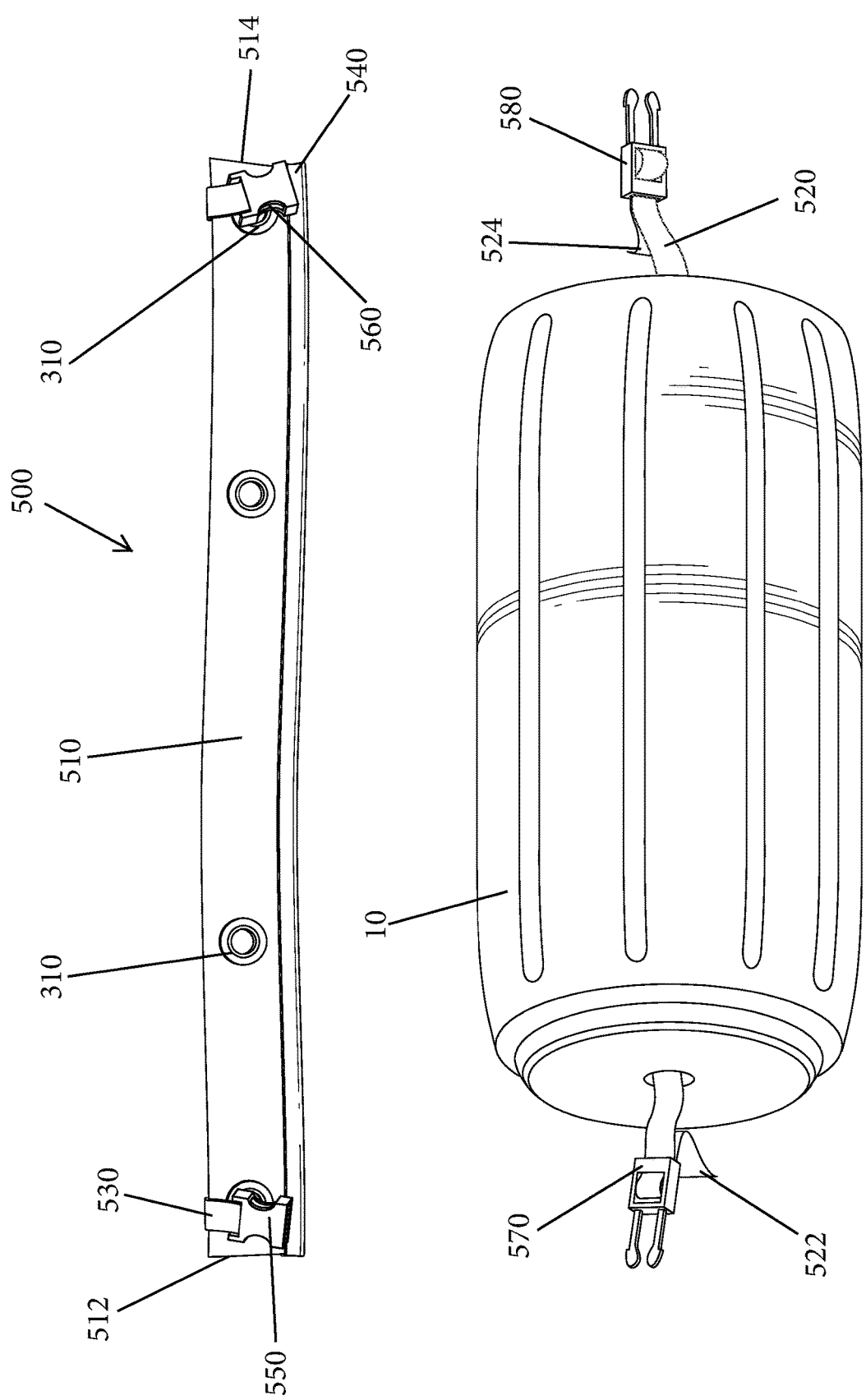
FIG. 5 is an exploded elevation view of a holster according to another embodiment.

FIG. 5 illustrates a device 500, according to another embodiment, for securely holding the boat fender 10 along the structure 20, such as a dock or the like (FIG. 1). The device 500 can be thought of as being a holster or holder for the boat fender 10.

The device 500 includes a main strap 510 that has a first end 512 and an opposing second end 514. The main strap 510 can be in the form of a suitable marine fabric such as nylon or other fabric that withstand the outdoor elements. The main strap 510 also includes one set of grommets 310 can be provided along the length of the main strap 510 in spaced relationship. The grommets 310 receive fasteners for attaching the main strap 510 to the structure 20. The main strap 510 is intended for securement to the edge of the structure 20 much like the earlier embodiments. To hold the boat fender 10, the device 500 includes a secondary strap 520 that can have an adjustable length and has a first end 522 and an opposing second end 524.

In one embodiment, at the first end 512, there is a first connector strap 530 and at the second end 514, there is a second connector strap 540. These two straps 530, 540 extend outwardly from the main strap 510 (e.g., at 90 degree angle).

At the end of the strap 530 there is a first connector 550 and at the end of the strap 540 there is a second connector 560. The connectors 550, 560 are used to connect the secondary strap 520 to the main strip 510. At the ends 522, 524 of the secondary strap 520, there are third and fourth connectors 570, 580.

In one embodiment, the connectors 550, 560 can be in the form of female buckle parts, while the connectors 570, 580 are male buckle parts. The female parts have a hollow center space for receiving the male parts and have a pair of side locking slots for receiving locking prongs of the male parts. To release the male part, the two flexible locking prongs are squeezed inwardly to clear the side locking slots and then the male and female parts are separated. This detachment allows the secondary strap 520 to be easily removed at one or more of its ends. It will also be understood that one end 522, 524 of the secondary strap 520 can be fixedly attached to the main strap 510 as by being stitched thereto or the like.

Alternatively, each of the first connector 550 and the second connector 560 can be in the form of a buckle that includes a pair of slots through which the secondary strap 520 can be fed and secured thereto as is known in the art. This type of securement also has an adjustable and also can be reversed in that the end of the secondary strap 520 can be detached from the buckle.

In use, much like the first embodiment, the boat fender 10 is secured by passing the secondary strap 520 through the center hole of the boat fender 10 and then securing both ends of the secondary strap 520 to the main strap 510. To make the boat fender 10 tight against the structure 20, the length of the secondary strap 520 is shortened. In this way, the boat fender 10 is held against structure 20 (dock).

Figure 6:
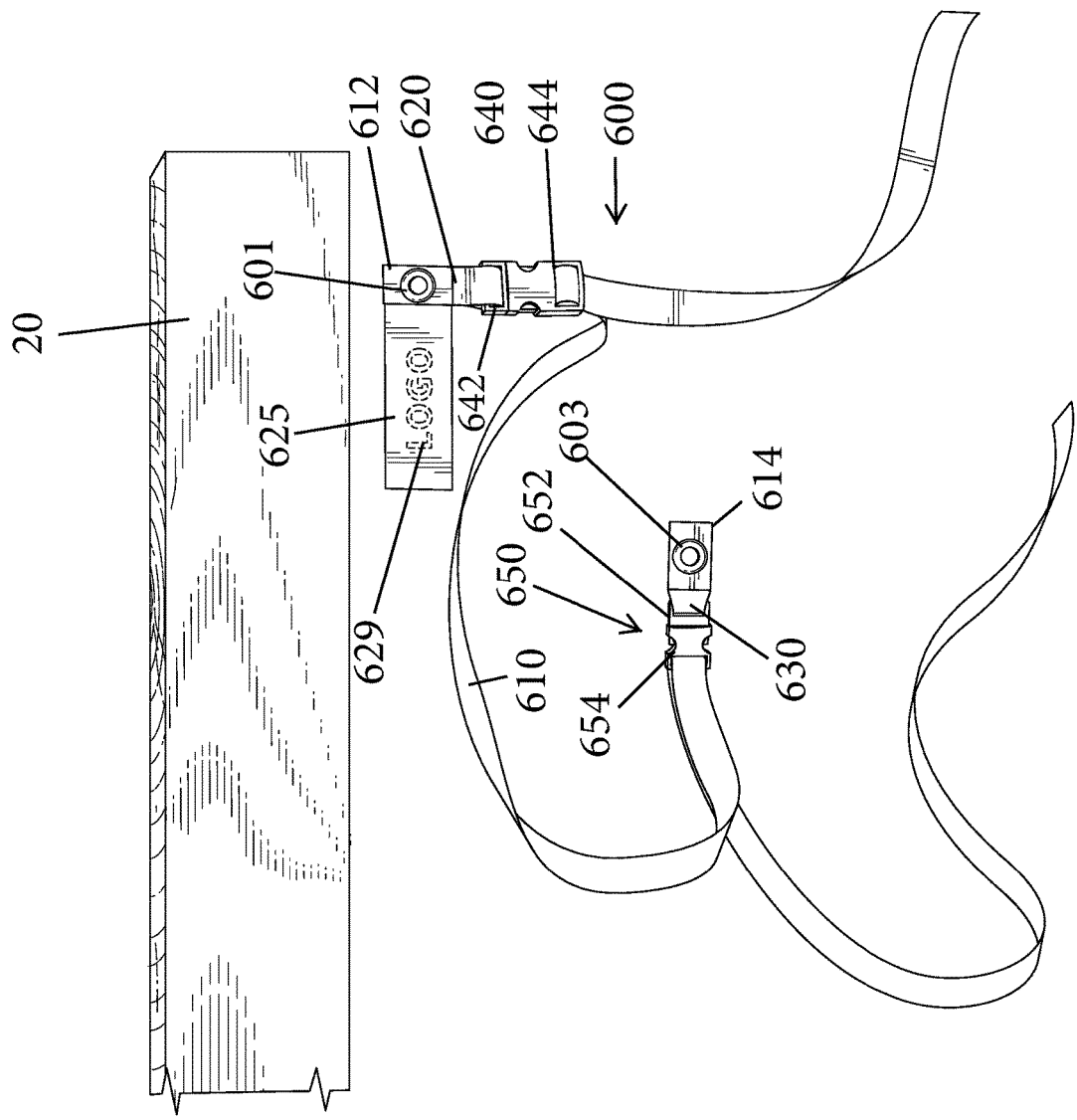
FIG. 6 is a top perspective view of a holster according to yet another embodiment and being shown separated from the dock.

FIGS. 6-7 illustrate a device 600, according to another embodiment, for securely holding the boat fender 10 along the structure 20, such as a dock or the like (FIG. 1). The device 600 can be thought of as being a holster or holder for the boat fender 10.

The device 600 has a first end 612 and an opposing second end 614. The device 600 includes a main strap 610 that has a first end and an opposing second end. As discussed in more detail below, the device 600 also includes a first end strap 620 and a second end strap 630. The first end strap 620 is detachably coupled to the first end of the main strap 610 by a first connector 640 and the second end strap 630 is detachably coupled to the second end of the main strap 610 by a second connector 650.

Each of the main strap 610, the first end strap 620, and the second end strap 630 can be in the form of a suitable marine fabric such as nylon or other fabric that withstand the outdoor elements.

The first connector 640 is formed of two parts, namely, a first connector part 642 and a second connector part 644 that mates and engages the first connector part 642 to connect the two parts 642, 644. Similarly, the second connector 650 is formed of two parts, namely, a third connector part 652 and a fourth connector part 654 that mates and engages the third connector part 652 to connect the two parts 652, 654. The first connector part 642 is associated with and is part of the first end strap 620, while the second connector part 644 is associated with and is coupled to one end of the main strap 610. Similarly, the third connector part 652 is associated with and is part of the second end strap 630, while the fourth connector part 654 is associated with and coupled to the other end of the main strap 610.

In the illustrated embodiment, the first connector 640 and the second connector 650 are in the form of snap-fit buckles. The first connector part 642 and the third connector part 652 are, in the illustrated embodiment, female buckle parts, while the second and fourth connectors 644, 654 are male buckle parts. The female first and third connector parts 642, 652 have a hollow center space for receiving the male second and fourth connector parts 644, 654 and have a pair of side locking slots for receiving locking prongs of the male second and fourth connector parts 644, 654. To release each male part, the two flexible locking prongs are squeezed inwardly to clear the side locking slots and then the male and female parts are separated. This detachment allows the main strap 610 to be easily removed at one or more of its ends from the respective first and second end straps 620, 630.

The length of the main strap 610 can be adjusted at one or both of its ends due to the manner in which the main strap 610 is coupled to the male second and fourth connector parts 644, 654. In particular, as shown, the looping nature of the main strap within each of the male second and fourth connector parts 644, 654 allows the overall length of the main strap 610 to be adjusted.

As shown, the first end strap 620 and the second end strap 630 are much shorter in length than the main strap 610.

As shown, the first end strap 620 can include a side strap 625 that provide surface area on which indicia 629 can be printed, such as a product name, a company name, logo, etc. The length of the side strap 625 can be selected in view of the size of the indicia 629, etc. The side strap 625 can be attached to the first end strap 620 using conventional techniques, such as stitching. As shown, the first strap 625 can be oriented perpendicular to the first end strap 620.

The device 600 includes one set of grommets to assist in anchoring the device 600 to the dock. As illustrated, the one set of grommets includes a first grommet 601 that is located along the first end strap 620 and a second grommet 603 that is located along the second end strap 630. The first and second grommets 601, 603 receive fasteners 605 for attaching the first end strap 620 and the second end strap 630 to the structure (dock) 20. The main strap 610 is intended for securement to the edge of the structure 20 much like the earlier embodiments. To hold the boat fender 10, the device 500 includes the main strap 610 that can have an adjustable length and is configured to pass through the through hole formed in the boat fender 10.

FIG. 6 shows the device 600 prior to attachment to the structure 20, while FIG. 7 shows it attached to the structure 20.

To attach the device 600 to the structure 20, the first end strap 620 is placed over the structure 20 at a desired position and then the fastener 605 is passed through the first grommet 60. Into the structure 620. This results in the first end strap 620 being anchored to the structure 20. The second end strap 630 is then positioned over the structure 20 at a desired location and then the fastener 605 is passed through the second grommet 603 into the structure 20.

To attach the boat fender 10 to the device 600, one or both of the male second and fourth connector parts 644, 654 are detached from the respective female first and third connector parts 642, 652 resulting in the first and second end straps 620, 630 being separated from the main strap 610 but remaining anchored to the structure 20. The main strap 610 is then fed through the hole in the boat fender 610 so that the male second and fourth connector parts 644, 654 extend beyond the ends of the boat fender 610 to allow for reattachment to the female first and third connector parts 642, 652 resulting in the boat fender 10 being attached to the structure 20.

It will be appreciated that the first and second end straps 620, 630 can remain attached to the structure 20 for an extended period of time without attachment to the main strap 610. For example, during off season or when the boat is not present, the user can simply detach the main strap 610 and the boat fender 10 and take it with him/her leaving behind the first and second end straps 620, 630.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A device for holding a boat fender in place at an installation site comprising:
   a main fabric body that is foldable and has a first end, an opposing second end, a first side, and an opposing second side;
   first and second adjustable fasteners configured to attach the second end to the first end for allowing the main fabric body to cradle and hold the boat fender; and
   a boat fender strap that has a first end coupled to the main fabric body and an opposing second end that is detachably coupled to the main fabric body, the boat fender strap being configured to pass through a center hole of the boat fender for securely attaching the boat fender to the main fabric body;
   wherein the first end of the boat fender strap is attached to the first side of the main fabric body and the opposing second end is detachably attached to the second side of the main fabric body, wherein the first and second adjustable fasteners are attached to the first and second ends of the main fabric body.

2. The device of claim 1, wherein the main fabric body comprises a marine fabric.

3. The device of claim 1, wherein each of the first adjustable fastener and the second adjustable fastener comprises a plastic quick side release snap buckle.

4. The device of claim 3, wherein each of the first adjustable fastener and the second adjustable fastener includes a first buckle part attached to the first end and a second buckle part attached to the second end.

5. The device of claim 4, wherein the first buckle part comprises one of a male buckle part and a female buckle part and the second buckle part comprises the other of the male buckle part and the female buckle part.

6. The device of claim 1, wherein the boat fender strap comprises a fabric strap.

7. The device of claim 1, wherein the first end of the boat fender strap is detachably attached to the main fabric body.

8. The device of claim 1, wherein the main fabric body has a rectangular shape.

9. A device for holding a boat fender in place at an installation site comprising:
   a main fabric body that is foldable and has a first end, an opposing second end, a first side, and an opposing second side;
   first and second adjustable fasteners configured to attach the second end to the first end for allowing the main fabric body to cradle and hold the boat, fender; and
   a boat fender strap that has a first end coupled to the main fabric body and an opposing second end that is detachably coupled to the main fabric body, the boat fender strap being configured to pass through a center hole of the boat fender for securely attaching the boat fender to the main fabric body;

wherein the main fabric body has a base layer formed of a marine fabric and a second layer that is located only on one face of the base layer in a region for contacting a boat's hull, the second layer being formed of a fabric that is more plush than the marine fabric.

10. A device for holding a boat fender in place at an installation site comprising:

a main fabric body that is foldable and has a first end, an opposing second end, a first side, and an opposing second side;

first and second adjustable fasteners configured to attach the second end to the first end for allowing the main fabric body to cradle and hold the boat fender; and a boat fender strap that has a first end coupled to the main fabric body and an opposing second end that is detachably coupled to the main fabric body, the boat fender strap being configured to pass through a center hole of the boat fender for securely attaching the boat fender to the main fabric body;

wherein the first end of the boat fender strap includes a first fastener part and the second end of the boat fender strap includes a second fastener part, the first fastener part being detachably coupled to a third fastener part, at the first side of the main fabric body and the second fastener part being detachably coupled to a fourth fastener part at the second side of the main fabric body, wherein the first fastener part, the second fastener part, the third fastener part and the fourth fastener part comprise snaps.

11. The device of clamp 10, wherein the boat fender strap further includes a fifth fastener part, and a sixth fastener part that are disposed between the first and second ends of the boat fender strap, the first end of the main fabric body includes a seventh fastener part and an eighth fastener part, the fifth fastener part detachably coupling to the seventh fastener part and the sixth fastener part detachably coupling to the eighth fastener part, wherein the fifth fastener part, the sixth fastener part, the seventh fastener part and the eighth fastener part comprise snaps.

* * * * *